US009600930B2

(12) United States Patent
Chen et al.

(10) Patent No.: US 9,600,930 B2
(45) Date of Patent: Mar. 21, 2017

(54) METHOD AND APPARATUS FOR OPTIMIZED PRESENTATION OF COMPLEX MAPS

(71) Applicant: QUALCOMM Incorporated, San Diego, CA (US)

(72) Inventors: Jiajian Chen, San Jose, CA (US); Saumitra Mohan Das, Santa Clara, CA (US); Hui Chao, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 191 days.

(21) Appl. No.: 14/103,765

(22) Filed: Dec. 11, 2013

(65) Prior Publication Data

US 2015/0161819 A1    Jun. 11, 2015

(51) Int. Cl.
| | | |
|---|---|---|
| G06T 15/80 | (2011.01) | |
| G06T 17/05 | (2011.01) | |
| G01C 21/36 | (2006.01) | |
| G06T 19/00 | (2011.01) | |
| G09B 29/00 | (2006.01) | |

(52) U.S. Cl.
CPC .......... *G06T 17/05* (2013.01); *G01C 21/3667* (2013.01); *G06T 19/00* (2013.01); *G09B 29/003* (2013.01); *G09B 29/005* (2013.01)

(58) Field of Classification Search
CPC ..... G01C 21/3667; G06T 17/05; G06T 19/00; G08G 1/0969; G09B 29/106
See application file for complete search history.

(56) References Cited

U.S. PATENT DOCUMENTS 5,249,264 A * 9/1993 Matsumoto ............ G06T 15/30
345/421
7,728,853 B2   6/2010 Plocher et al.
(Continued)

FOREIGN PATENT DOCUMENTS

EP    1126245 A2    8/2001

OTHER PUBLICATIONS

Niederauer, C., Houston, M., Agrawala, M. and Humphreys, G. "Non-Invasive Interactive Visualization of Dynamic Architectural Environments," Proc. of ACM SIGGRAPH'03 Symposium on Interactive 3D Graphics, 2003, pp. 55-58 and 236.*

(Continued)

*Primary Examiner* — Sing-Wai Wu
(74) *Attorney, Agent, or Firm* — Kilpatrick Townsend & Stockton LLP

(57) ABSTRACT

Methods and devices are described for optimizing display of information such as map data on a mobile device. Certain embodiments may include receiving, at a mobile device, a first and second set of placement data associated with a first and second object. The mobile device may then determine overlap between a representation of the first object and the second object in a rendering of an image comprising the representation of the first object and the second object, using a set of viewing parameters, the first set of placement data and the second set of placement data. The set of viewing parameters may be adjusted to reduce overlap between the representation of the first object and the second object in the rendering of the image. In additional embodiments, 3D enhancements to two-dimensional map objects may be added to enhance the presentation of the information.

20 Claims, 10 Drawing Sheets

(56) References Cited

U.S. PATENT DOCUMENTS

| | | | |
|---|---|---|---|
| 8,233,008 B2 | 7/2012 | Jin et al. | |
| 8,243,065 B2 | 8/2012 | Kim | |
| 8,464,181 B1 | 6/2013 | Bailiang et al. | |
| 2001/0016796 A1* | 8/2001 | Ata | G01C 21/3682 701/438 |
| 2004/0186631 A1* | 9/2004 | Ohta | G06T 15/60 700/303 |
| 2009/0237396 A1 | 9/2009 | Venezia et al. | |
| 2010/0066559 A1* | 3/2010 | Judelson | G06T 19/00 340/8.1 |
| 2011/0270584 A1* | 11/2011 | Plocher | G06F 17/5004 703/1 |
| 2013/0054573 A1* | 2/2013 | Snellman | G06F 17/30554 707/722 |
| 2013/0131978 A1 | 5/2013 | Han et al. | |
| 2015/0130788 A1* | 5/2015 | Bailiang | G06T 15/10 345/419 |

OTHER PUBLICATIONS

International Search Report and Written Opinion—PCT/US2014/065137—ISA/EPO—Jun. 29, 2015.
Whiting E.J., "Geometric, Topological & Semantic Analysis of Multi-Building Floor Plan Data", Master of Science in Architecture Studies at Massachusetts Institute of Technology, May 2006, pp. 1-70.
Partial International Search Report—PCT/US2014/065137—ISA/EPO—Feb. 13, 2015.

* cited by examiner

METHOD AND APPARATUS FOR OPTIMIZED PRESENTATION OF COMPLEX MAPS

FIELD

Aspects of the disclosure relate to electronic maps, and particularly to the automatic selection of viewing parameters such as virtual camera placement in presentation of multi-level or three-dimensional maps.

BACKGROUND

As mobile electronic devices capable of displaying local and building level maps become more prevalent, and location services become more common, mobile devices which are using location services may have access to map information which represents three dimensions. Complex venue sites, such as university buildings, business offices and shopping malls, can have complex layouts and become daunting to navigate for a user. Geometric structures of points of interests (POIs) on different floors make these maps difficult to use. This problem is further exacerbated by the small screen of many mobile devices. Improved systems and methods for presenting three-dimensional data and maps may thus be desirable.

BRIEF SUMMARY

Embodiments described herein include a method for optimized map presentation. For example, one embodiment may be a method comprising receiving, at a mobile device, a first set of placement data associated with a first object; receiving, at the mobile device, a second set of placement data associated with a second object; and determining, at the mobile device, overlap between a representation of the first object and the second object in a rendering of an image comprising the representation of the first object and the second object, using a set of viewing parameters, the first set of placement data and the second set of placement data. The method may then further comprise adjusting, at the mobile device, the set of viewing parameters to reduce overlap between the representation of the first object and the second object in the rendering of the image.

Such a method may further function where the placement data comprises map data or where the first object comprises a first level of a location and the second object comprises a second level of the location. Such a method may further function where adjusting the set of viewing parameters comprises at least one of: changing a distance between a viewing position and the objects; changing a tilt associated with the viewing position; changing a distance between the first and second object; or changing a placement of the viewing position; or any combination thereof. Such a method may further function where determining overlap between the first object and the second object comprises rendering the image of the first object and the second object and determining that a ratio of (a) overlapping pixels between the first object and the second object to (b) a total number of pixels is beyond a threshold.

Such a method may further function where determining the overlap between the first object and the second object is performed in response to a change in a placement of a viewing position. Such a method may further function where the placement of the viewing position is changed by at least one of: an input received from a user, a context of the user, or a search query received from the user, or any combination of the above.

Such a method may further comprise determining a back-facing boundary associated with the first object and the second object; and shading a region between the back-facing boundary of the first object and the second object.

Another embodiment may be a device with optimized functionality for map presentation, the device comprising: a memory; a display output; and a processor coupled to the memory and the display output, wherein the memory comprises a 3D display management module that, when executed by the processor, causes the processor to perform certain functions. As part of such functions, the processor may: receive a first set of placement data associated with a first object; receive a second set of placement data associated with a second object; determine overlap between a representation of the first object and the second object in a rendering of an image comprising the representation of the first object and the second object, using a set of viewing parameters, the first set of placement data and the second set of placement data; and adjust the set of viewing parameters to reduce overlap between the representation of the first object and the second object in the rendering of the image. The device may further comprise a display output, wherein the processor further outputs an adjusted rendering of the image to the display output for display.

In additional embodiments, such a device may function where the placement data comprises map data or where the first object comprises a first level of a location and the second object comprises a second level of the location. Additional embodiments may function where adjusting the set of viewing parameters comprises changing a distance between a viewing position and the objects, changing a tilt associated with the viewing position, changing a distance between the first and second object, and changing a placement of the viewing position.

Such a device may further comprise an antenna and a transceiver coupled to the antenna and the processor, wherein the first set of placement data and the second set of placement data is received at the antenna and communicated to the memory via the transceiver prior to the processor receiving the first set of placement data and the second set of placement data.

Another embodiment may be a device with optimized functionality for map presentation, the device comprising: means for receiving, at a mobile device, a first set of placement data associated with a first object; means for receiving, at the mobile device, a second set of placement data associated with a second object; means for determining, at the mobile device, overlap between a representation of the first object and the second object in a rendering of an image comprising the representation of the first object and the second object, using a set of viewing parameters, the first set of placement data and the second set of placement data; and means for adjusting, at the mobile device, the set of viewing parameters to reduce overlap between the representation of the first object and the second object in the rendering of the image.

Another embodiment may be a device where the placement data comprises map data and wherein the first object comprises a first level of a location and the second object comprises a second level of the location. Another embodiment may be a device wherein means for adjusting the set of viewing parameters comprises means for changing a distance between a viewing position and the objects, changing a tilt associated with the viewing position, changing a distance between the first and second object, and changing a placement of the viewing position.

Another embodiment may be a device further comprising means for determining a back-facing boundary associated with the first object and the second object; and means for shading a region between the back-facing boundary of the first object and the second object.

Another embodiment may be a non-transitory computer-readable medium comprising computer-readable instructions for map presentation that, when executed by a processor, cause a mobile device to perform a method for optimized display of maps, the method comprising: receiving, at the mobile device, a first set of placement data associated with a first object; receiving, at the mobile device, a second set of placement data associated with a second object; determining, at the mobile device, overlap between a representation of the first object and the second object in a rendering of an image comprising the representation of the first object and the second object, using a set of viewing parameters, the first set of placement data and the second set of placement data; and adjusting, at the mobile device, the set of viewing parameters to reduce overlap between the representation of the first object and the second object in the rendering of the image.

An additional embodiment may function where adjusting the set of viewing parameters comprises changing a distance between a viewing position and the objects, changing a tilt associated with the viewing position, changing a distance between the first and second object, and changing a placement of the viewing position.

An additional embodiment may function where determining overlap between the first object and the second object comprises rendering an image of the first object and the second object and determining that a ratio of overlapping pixels between the first object and the second object to a total number of pixels are beyond a threshold.

An additional embodiment may function where determining the overlap between the first object and the second object is performed in response to a change in a placement of a viewing position; and wherein the placement of the viewing position is changed by at least one of: an input received a user, context of the user, or a search query received from the user, or any combination of the above.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments described herein include systems, methods, devices, and computer-readable media for improved presentation of object and map data. Certain embodiments may be particularly directed to mobile electronic devices which may display map data. It will be understood, however, that a wide variety of other implementations will be available in accordance with the embodiments described herein.

In one example, a mobile device may have map information for a two-story building, with the map for each floor in a two-dimensional format. A top down view of both floors together would either block most of the lower floor if the maps are opaque, or cause confusion as to what information was associated with which floor if the maps are transparent. Embodiments described herein may change a viewing angle and a relative distance between the maps without distorting the position between points above and below each other in the map information of each floor, in order to reduce the overlap between the maps as output on the display.

In certain embodiments, techniques described herein propose a method and apparatus for adjusting the viewing parameters associated with a viewing position (e.g., a virtual camera in rendering software such as OpenGL) to reduce the overlapping of point of interest (POI) information in three-dimensional (3D) display for indoor maps. The viewing parameters associated with a viewing position can be optimized for displaying complex venues in a default view, given the POI information and the geometry of these POIs. In one aspect, the virtual camera discussed herein is a camera library function used in rendering software, such as OpenGL, that simulates the perspective of a user viewing the device display of the mobile device. In one embodiment, for example, viewing parameters for such a rendering may be encapsulated in a 4×4 matrix for rendering in 3D rendering systems (e.g., OpenGL and DirectX). In other embodiments, other matrix sizes or rendering methods may be used. In another aspect, the 3D image discussed herein is a simulated 3D image displayed in two dimensions on the mobile display.

Figure 1:
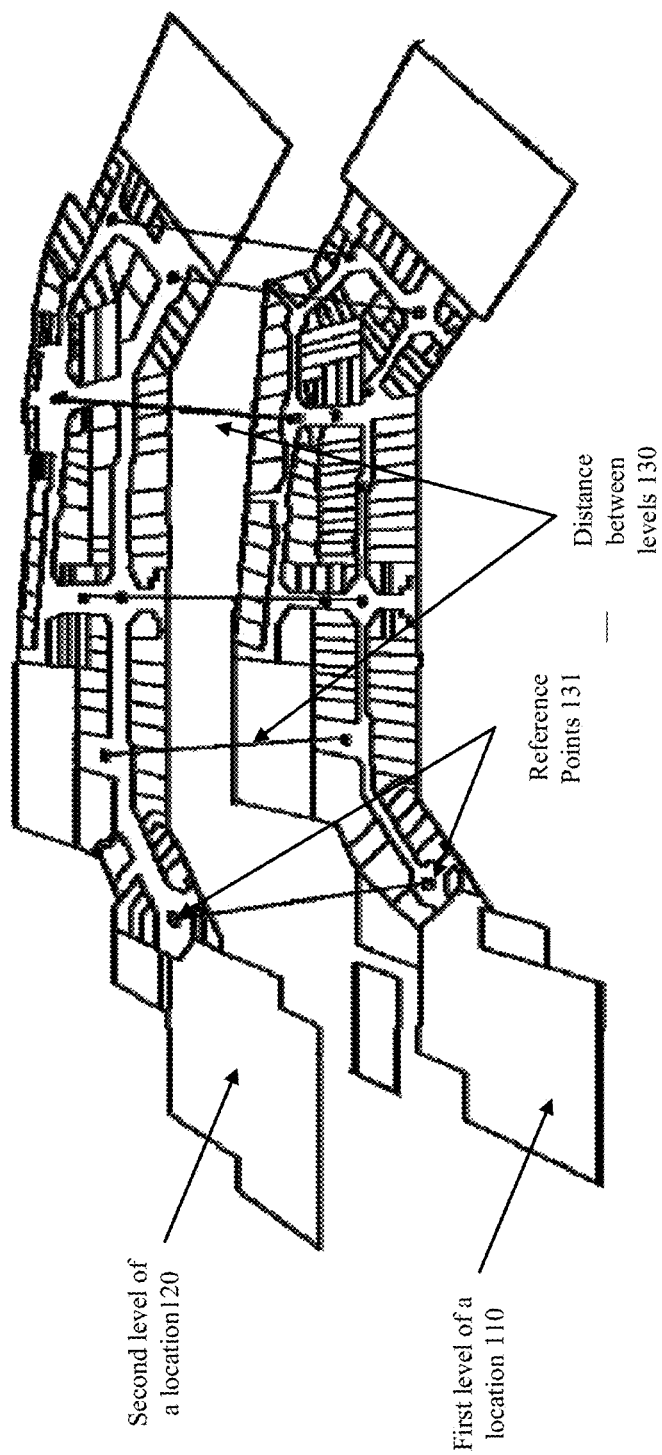
FIG. 1 describes map or object data according to one embodiment.

A display in a mobile device is typically a two-dimensional display. In the embodiments described herein, such a two-dimensional display may be used for presenting three-dimensional information. Because of this, additional considerations beyond what is presented in a top down two-dimensional map may be helpful in providing information to a viewer. The information in FIGS. 1-3 is presented from multiple and differing viewing perspectives. Changes are such that a viewing perspective or virtual "camera" position may be selected by user input or automatically selected by the mobile device in order to provide the three-dimensional information to a viewer in an acceptably understandable format. Viewing parameters that set the viewing perspective or virtual camera position may have associated threshold values, and as is described for the various embodiments herein, changes in the virtual camera position may be made to create an output image that falls within the threshold values of the viewing parameters. FIGS. 1-3 detail aspects of such viewing parameters.

FIG. 1, for example, shows map object information for a first level of a location 110 and a second level of a location 120. The term "location" as referred to herein may refer to a building, an environment, an area, an open air venue, a stadium, a park, or any similar such space which may include multiple levels. The information of FIG. 1 may, for example, be information output by a display of a mobile electronic device. Reference points 131 indicate a point in each level that is in the same position at a different height, in order to provide information to a viewer about the relationship between the levels. The distance between levels 130 is not presented to scale, but is instead set to optimize the display of the multiple levels according to predetermined preferences. This distance between levels 130 may be optimized to reduce overlap, to enable certain viewing elevations, or as an optimized viewing parameter along with any number of other viewing parameters.

Figure 2A:
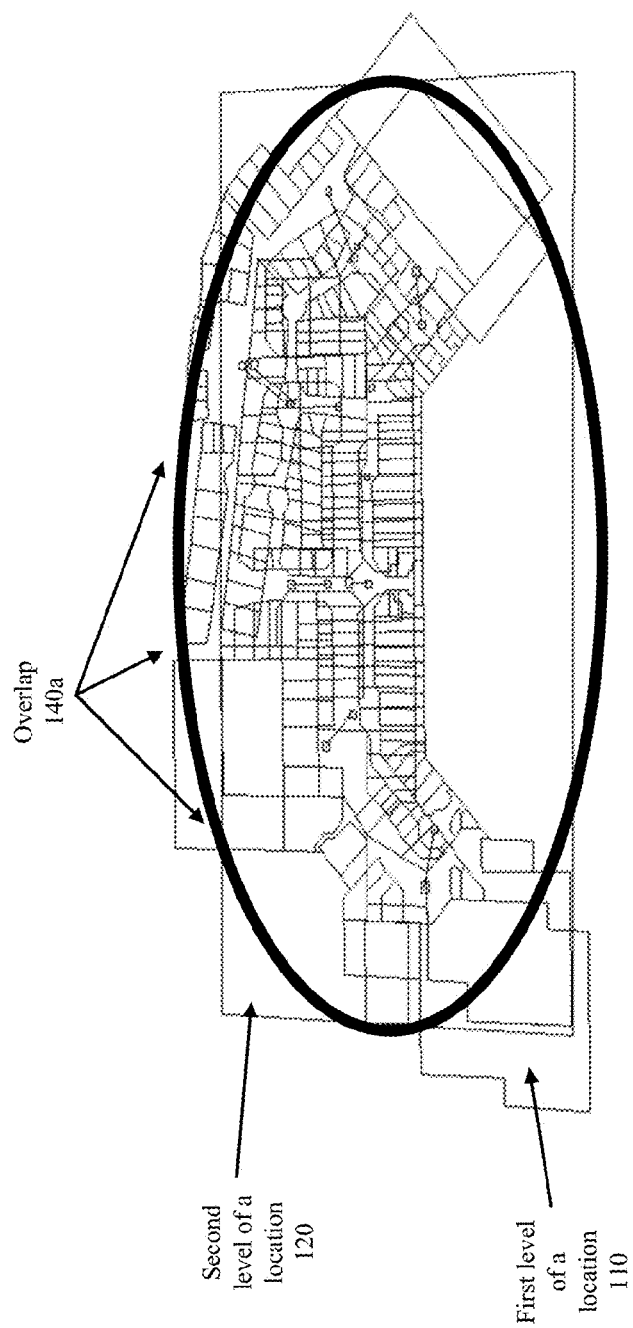
FIG. 2A describes map or object data according to one embodiment.

FIG. 2A shows another perspective of the levels from FIG. 1, including the first level of a location 110 and the second level of a location 120. FIG. 2A may be considered the combination of two top down maps which are widely available for many locations. The perspective of FIG. 2A includes a significant amount of overlap 140a when using such top down maps to show multiple levels of the same top down space. FIG. 2A thus illustrates rendering of an image using image data for two levels of a multi-level building without using the optimization techniques described herein, but may be considered a starting point from initial top down map information. As shown in FIG. 2, the data associated with the two levels overlaps significantly and does not provide a useful view of the data for the user to navigate the venue. For complex venue maps, which may be a shopping mall that includes a large number of stores or an apartment complex with a large number of units, such a view can be very overwhelming for the user. While this view may be typical when only a single level is being presented in a display, in order to present multiple levels, a different viewing angle provides reduced overlap and less confusion. Also, in FIG. 2A, the distance between levels 130 is not visible since the reference points 131 are essentially on top of each other.

Figure 2B:
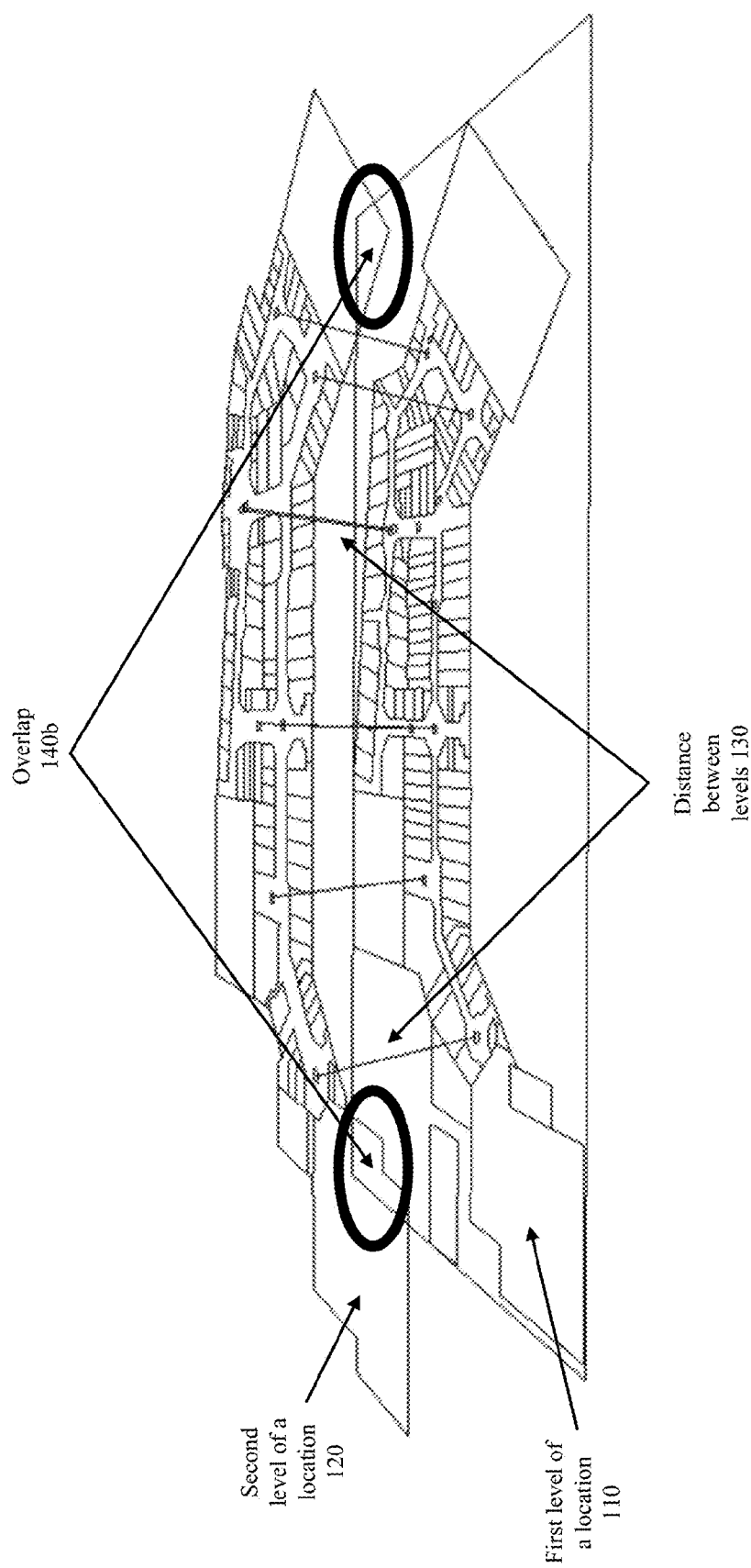
FIG. 2B describes map or object data according to one embodiment.
Figure 3:
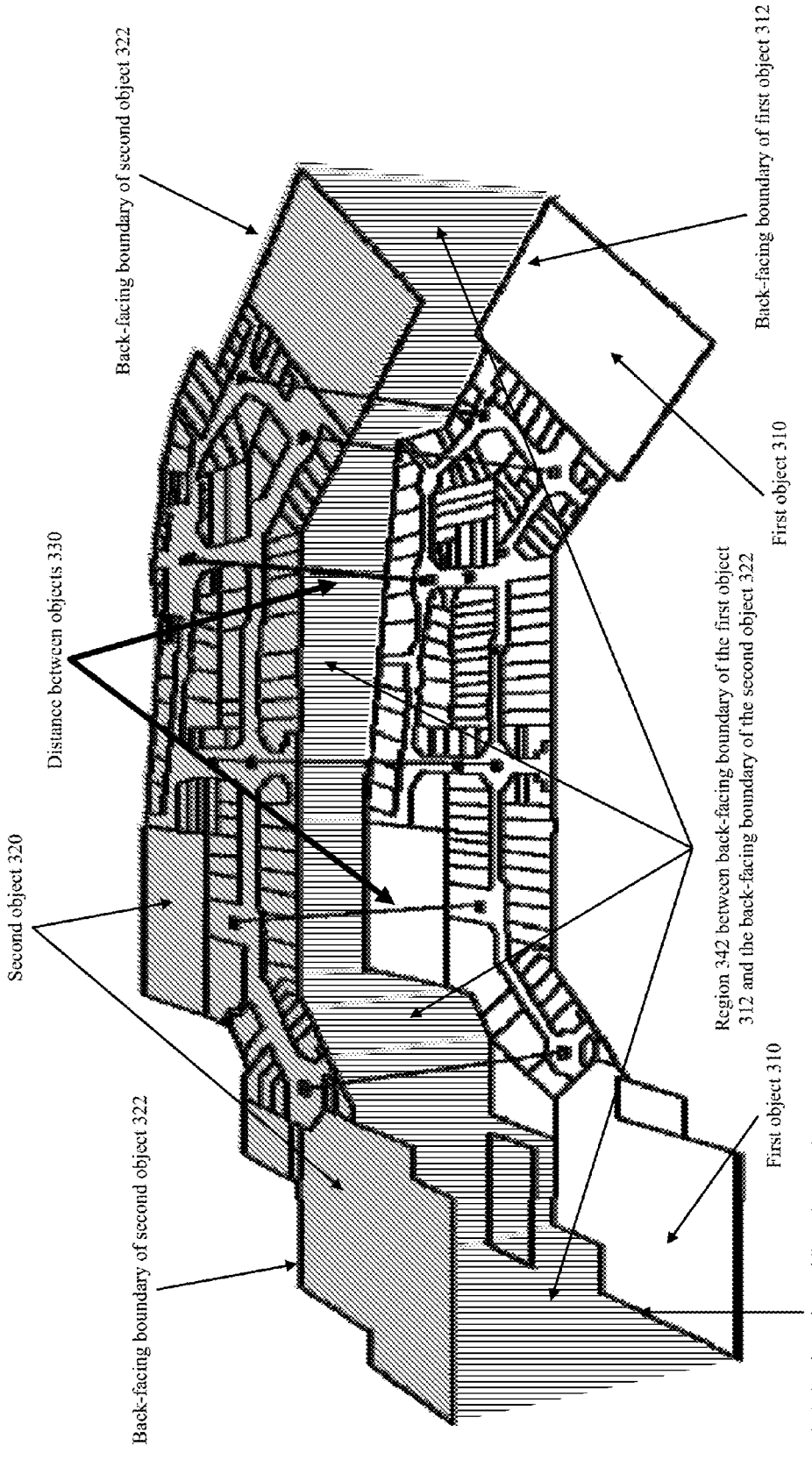
FIG. 3 describes map or object data according to one embodiment.

In FIG. 2B, then another view of the first level of the location 110 and the second level of the location 120 are shown. In this view, there is still a certain amount of overlap, shown as overlap 140b. This overlap is less than the overlap 140a of FIG. 2A, and any loss of information or confusion due to overlap 140b is minor FIG. 2B thus illustrates rendering of an image using the same image data for two levels of a multi-level building discussed in FIG. 2A, using techniques described herein. As shown in FIG. 2B, by detecting overlap of the image data and adjusting viewing parameters of the virtual camera, the two levels of a multi-level building may be displayed in a manner that provides the user with useful navigation information that minimizes overlap between the two levels of the multi-level building. This enables top down map views to be transformed in a way that enable three-dimensional views of a location that may be automatically customized to typical or user-selected preference thresholds.

FIG. 3 describes a further enhanced embodiment of information that may be displayed. After an acceptable view is selected along with any associated viewing parameters, such as distance between levels, such additional enhancements may be added. FIG. 3 includes a representation of first object 310 and a representation of second object 320 as part of information to be displayed on, for example, a mobile device. These objects have been analyzed and set as having an acceptable amount of overlap and positioning. Just as in FIG. 1, FIG. 3 includes distance between objects 330. The image of FIG. 3 also includes shading to provide additional three-dimensional information to a viewer. In particular, shading in region 342 between a back-facing boundary of the first object 312 and a back-facing boundary of the second object 322. In certain embodiments, once viewing parameters are set for presentation of the three-dimensional objects, shading in region 342 may be added to the display to provide additional clarity in the presentation of the three-dimensional information from a two-dimensional display screen of a mobile device. FIG. 3 thus illustrates a rendering of the data associated with the two floors of the multi-floor building. As shown, the data may be rendered to further enhance the 3D effect created from placing two levels in the same rendered image, and facilitate easy viewing of the navigation data for the user. One implementation may include determining the back-facing boundaries associated with the two floors of the multi-floor building, connecting the boundary walls and shading those walls with one color, and shading the top floor with a different hue than the boundary wall. In various other embodiments, additional color enhancements may be made to enable distinction between the level information being presented in the single image rendering. For example, different levels may have slight color differences in shading.

Figure 4:
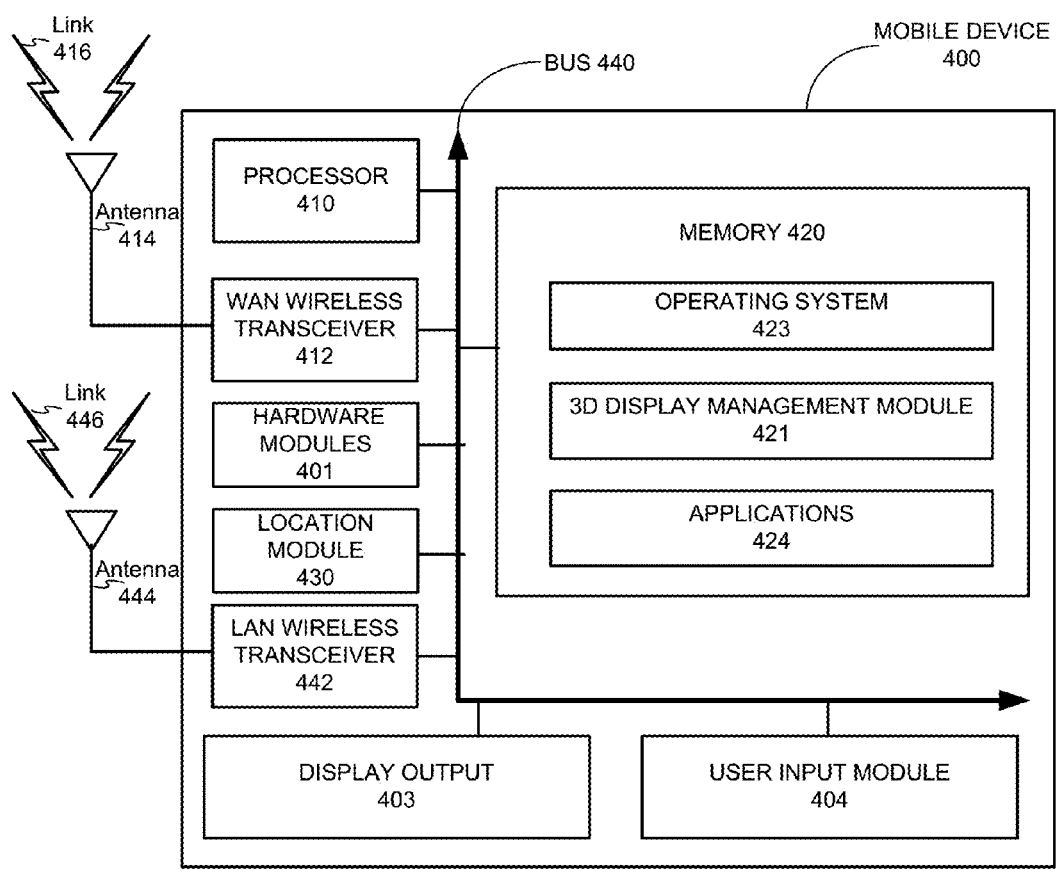
FIG. 4 is one example of a mobile device for use with an embodiment.

FIG. 4 now describes one implementation of a mobile device 400 according to certain embodiments. Mobile device 400 of FIG. 4 may be used to output an image similar to the images of FIGS. 1-3 using a 3D display management module 421. Mobile device 400 may also implement processing steps to transform an image such as the image of FIG. 2A into the image of FIG. 2B using a processor 410 along with computer-readable instructions that may be stored in memory 420. 3D display management module 421 may include a set of thresholds for acceptable characteristics of an output image, as well as processes for adjusting viewing parameters and measuring image characteristics to achieve the acceptable characteristics for an output image. Additional details of such processes which may be initiated and managed by 3D display management module 421 are described below with respect to FIGS. 5-8.

In certain embodiments, where a device such as mobile device 400 is to display a three-dimensional output, one or more relevant pieces of image, object, or map level information may be received from links 416 or 446 and then stored in memory 420, either as part of an application 424, or in a non-transitory storage of memory 420. The information may then be merged and/or adjusted with a device-selected virtual camera perspective by 3D display management module 421 before being presented to a user on a display output 403.

In the embodiment shown at FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some embodiments, memory 420 offers both short-term and long-term storage and may in fact be divided into several units. Memory 420 may be volatile, such as static random access memory (SRAM) and/or dynamic random access memory (DRAM), and/or non-volatile, such as read-only memory (ROM), flash memory, and the like. Furthermore, memory 420 can include removable storage devices, such as secure digital (SD) cards. Thus, memory 420 provides storage of computer-readable instructions, data structures, program modules, and other data for mobile device 400. In some embodiments, memory 420 may be distributed into different hardware modules 401.

In some embodiments, memory 420 stores a plurality of application modules, which may be any number of applications 424. Application modules contain particular instructions to be executed by processor 410. In alternative embodiments, other hardware modules 401 may additionally execute certain applications 424 or parts of applications 424. In certain embodiments, memory 420 may additionally include secure memory, which may include additional security controls to prevent copying or other unauthorized access to secure information such as private or secure map information or private placement data which may be part of level, map, or object information.

In some embodiments, memory 420 includes an operating system 423. Operating system 423 may be operable to initiate the execution of the instructions provided by application modules and/or manage other hardware modules 401 as well as interfaces with communication modules which may use WAN wireless transceiver 412 and LAN wireless transceiver 442 to receive information from link 416 via antenna 414 and/or link 446 via antenna 444, respectively. Operating system 423 may be adapted to perform other operations across the components of mobile device 400 including threading, resource management, data storage control and other similar functionality.

In some embodiments, mobile device 400 includes a plurality of other hardware modules 401. Each of other hardware modules 401 is a physical module within mobile device 400. However, while each of hardware modules 401 is permanently configured as a structure, a respective one of hardware modules 401 may be temporarily configured to perform specific functions or temporarily activated. A common example is an application module that may program a camera module (i.e., hardware module) for shutter release and image capture. A respective one of hardware modules 401 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of the hardware modules 401 may be implemented in software.

Mobile device 400 may include a component such as a wireless communication module which may integrate antenna 414 and wireless transceiver 412 with any other hardware, firmware, or software necessary for wireless communications. Such a wireless communication module may be configured to receive signals from various devices such data sources via networks and access points. In addition to other hardware modules 401 and applications 424 in memory 420, mobile device 400 may have a display output 403 and a user input module 404. Display output 403 graphically presents information from mobile device 400 to the user. This information may be derived from one or more applications 424, one or more hardware modules 401, a combination thereof, or any other suitable means for resolving graphical content for the user (e.g., by operating system 423). Display output 403 can be liquid crystal display (LCD) technology, light-emitting polymer display (LPD) technology, or some other display technology. In some embodiments, display output 403 is a capacitive or resistive touch screen and may be sensitive to haptic and/or tactile contact with a user. In such embodiments, the display output 403 can comprise a multi-touch-sensitive display. Display output 403 may then be used to display the three-dimensional map information as set by 3D display management module 421.

Additional embodiments of a mobile device may further comprise various portions of computing devices as are detailed below with respect to FIG. 9 and networks as detailed in FIG. 10.

Figure 5:
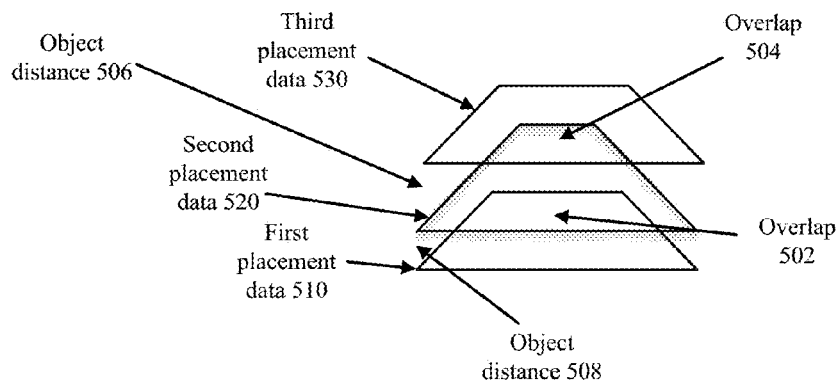
FIG. 5 describes map or object data according to one embodiment.
Figure 6:
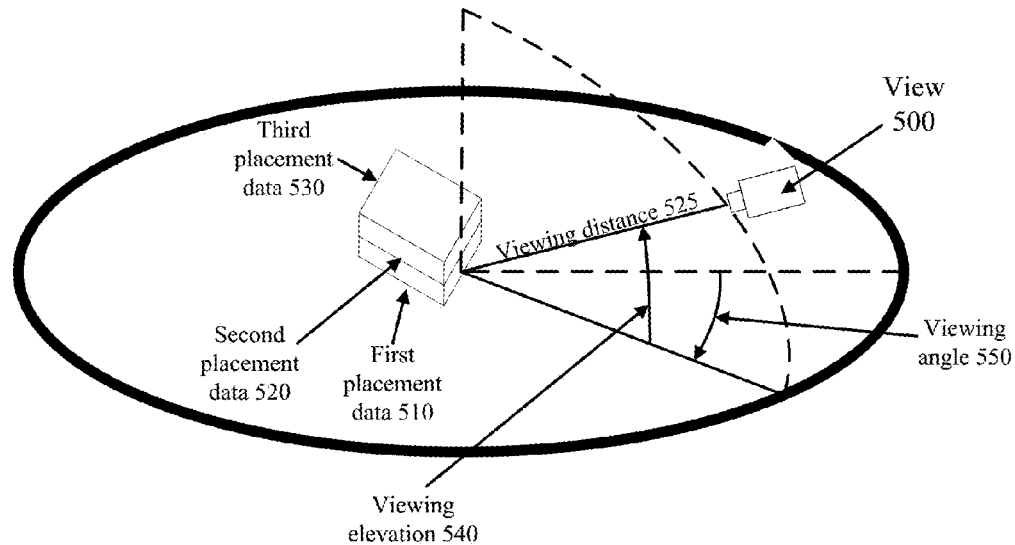
FIG. 6 illustrates certain viewing parameters according to some embodiments.

FIGS. 5 and 6 show another example of an image that may be output on a device such as mobile device 400. FIG. 5 shows placement data, which may be a representation of an object or may be map level data indicating the placement of walls, doors, or other location details. FIG. 6 shows one example of viewing parameters which may be used to select a perspective that creates the final image to be output, such as the image of FIG. 5.

FIGS. 5 and 6, as shown, both include first placement data 510, second placement data 520, and third placement data 530. FIG. 5 further includes overlap 502, which is an overlap between first placement data 510 and second placement data 520; object distance 506; and object distance 508. FIG. 5 also shows overlap 504, which is an overlap between second placement data 520 and third placement data 530. FIG. 6 additionally shows view 500, viewing distance 525, viewing elevation 540, and viewing angle 550.

Object distance 506 is the distance between third placement data 530 and second placement data 520, and object distance 508 is the distance between second placement data 520 and first placement data 510. While placement data as shown in the various figures herein are shown as parallel planes, in other embodiments, the placement data may be three-dimensional, with the distance set by corresponding points between different levels, such as a distance between two reference points 131.

The image of placement data in FIG. 5 may be considered the image taken from view 500. Viewing parameters may be considered object distances 506 and 508, viewing distance 525, viewing angle 550, and viewing elevation 540. Additional viewing parameters may include, for example, the tilt at view 500, which refers to the facing angle over view 500 even when viewing elevation 540, viewing distance 525, and viewing angle 550 stay the same. Such a viewing tilt may have multiple components, including horizontal and vertical tilt, as well as roll as the view spins while focused along one line. In various other embodiments, other coordinate systems or structures may be used to define such viewing parameters, including any parameter that may impact characteristics of the final output to be displayed on a device.

Field of view characteristics associated with the virtual camera or viewing perspective may also be considered viewing parameters.

In certain embodiments, a characteristic may be a ratio of placement data area to overlap area. If viewing angle 550 is increased, the placement data area will increase, but the overlap area will increase more quickly than the placement data area. The image of FIG. 2A is an example of overlap at a large viewing elevation. Similarly, if the viewing distance 525 is decreased with other parameters held constant, the placement area shown on a device display will increase, but the area of overlap will increase proportionately. Decreasing the viewing angle 550 or increasing object distances 506 and 508 may decrease overlap, but may make placement data difficult to view.

A system may thus have a set of output parameters that it may use to target an acceptable output. For example, one set of output parameters may be a minimum ratio of visible placement data area to device display area, and a maximum overlap to total placement data ratio, were the visible placement data is the visible area from view 500. In FIG. 5, for example, the entirety of third placement data 530 is visible placement data, but only the bottom part of first placement data 510 is visible placement data, because the rest is covered by overlap 502.

Figure 7:
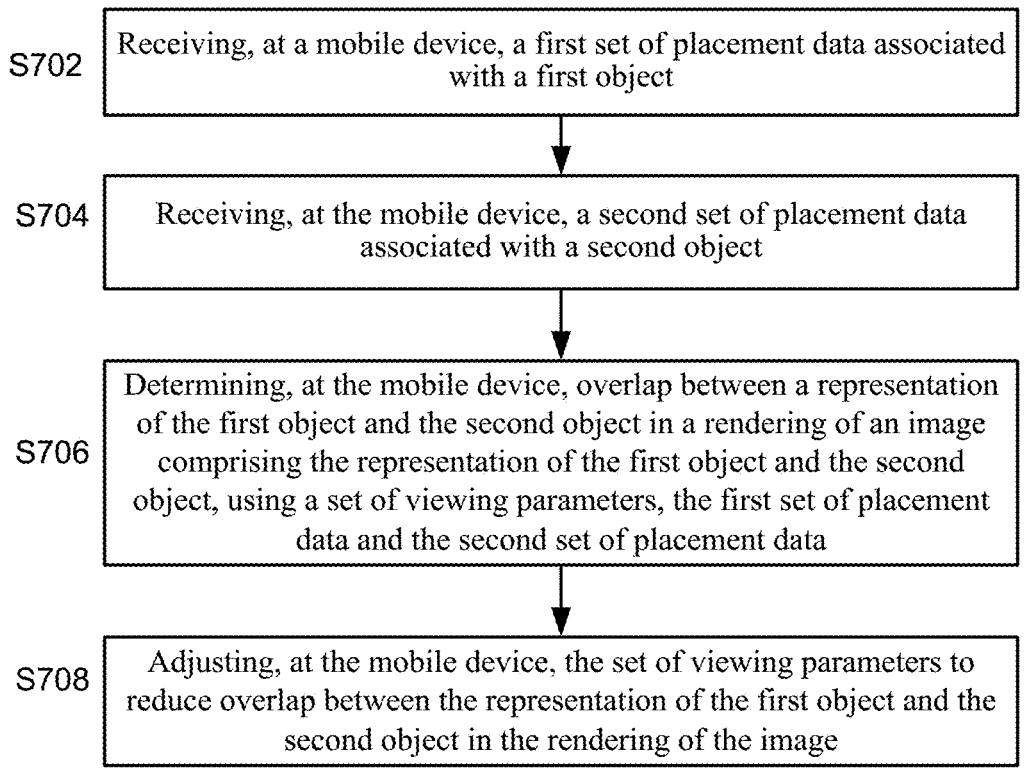
FIG. 7 describes a method for presenting map data in accordance with one embodiment.

FIG. 7, then, describes one embodiment of a method for optimized virtual camera or view placement for displaying complex venue maps on mobile devices. S702 involves receiving, at a mobile device, a first set of placement data associated with a first object. In certain embodiments, this may involve a wireless communication when the mobile device is on site at a location described by the set of placement data. In other embodiments, this may be a database of many different places that is downloaded to a mobile device. In further embodiments, a wired connection may be used to receive this information at the mobile device. S704 then further involves receiving, at the mobile device, a second set of placement data associated with a second object. This placement data may be received in the same way as the first set of placement data, or may be received in a different way. These two sets of placement data may be received at the same time as part of the same communication or parallel communications, or may be received at widely differing times as part of different communications.

S706 then involves determining, at the mobile device, overlap between a representation of the first object and the second object in a rendering of an image comprising the representation of the first object and the second object, using a set of viewing parameters, the first set of placement data and the second set of placement data. Then, step S708 includes adjusting, at the mobile device, the set of viewing parameters to reduce overlap between the representation of the first object and the second object in the rendering of the image.

Detecting an overlap between the data associated with the first representation and the second representation may include performing an overlapping test. In one implementation, the overlapping test may include rendering an image of the first object from the first representation and the second object from the second representation and determining that the ratio of overlapping pixels between the first floor and the second floor is beyond a threshold. The overlapping test may be performed in response to a change in the placement of the virtual camera or view. The placement of the virtual camera or view may be changed in response to input received by a user, the context of the user, or a search query received from the user. For example, in mobile device 400 as described by FIG. 4, a 3D display management module 421 may have a user interface that accepts inputs from a user input module 404 to set thresholds customized for display output 403. This may include ratio and pixel settings specific to display output 403. It also may include preferences related to certain viewing parameters, such as a maximum or minimum preferred viewing angle.

In further embodiments, such a ratio may only be for a portion of a map. For example, all clothing stores (based on a user's search query) in a certain floor can be treated as a single object in computing the overlap ratio. The method adjusts the virtual camera placement such that the clothing stores in two floors have less overlap in the 3D view. Thus, when a user is only focusing on viewing a map of clothing stores, an overlap analysis may similarly only focus on clothing stores. Similar analysis and virtual camera placement may be done for any searchable subset of map areas for any number of levels. Such partial map analysis may be set to automatically include pathways and areas around the transitions between levels including stairs, escalators, or elevators. Alternate embodiments may not include such pathway map areas in a partial overlap analysis.

Thus, as described by S706 and S708, the mobile device includes a processing component such as processor 410 which may automatically adjust the overlap between the representation of the first and second objects. In alternative embodiments, a processing component separate from the mobile device may perform such a determination of overlap along with the corresponding adjustment of the viewing parameters to adjust the overlap.

In certain embodiments, each object may be considered the physical level of a multi-level location, such as a mall, a department store, or an apartment complex. The representation of each object may be top down two-dimensional map data of a particular level of the location. In such embodiments, the mobile device may additionally perform a matching process to match corresponding points of the multiple representations. This may be done using, for example, reference points 131 which identify corresponding points between the two levels. These points may be identified by a device user, or may be extracted from the placement data. Elevator shafts, stairs, corners, columns, or other such elements of placement data may be used to identify such reference points. The device may then perform an additional transformation to set a typical view other than a top down two-dimensional map view. Determination of overlap and/or placement data size with respect to screen size may be performed after such an initial transformation of two-dimensional maps into a three-dimensional representation of a plurality of two-dimensional maps. In still further embodiments, the sets of placement data may be three-dimensional. The device may present stacked representations of three-dimensional placement data for multiple levels, or may flatten the three-dimensional placement data for each level into a two-dimensional map such as those shown in FIGS. 1-3.

Figure 8:
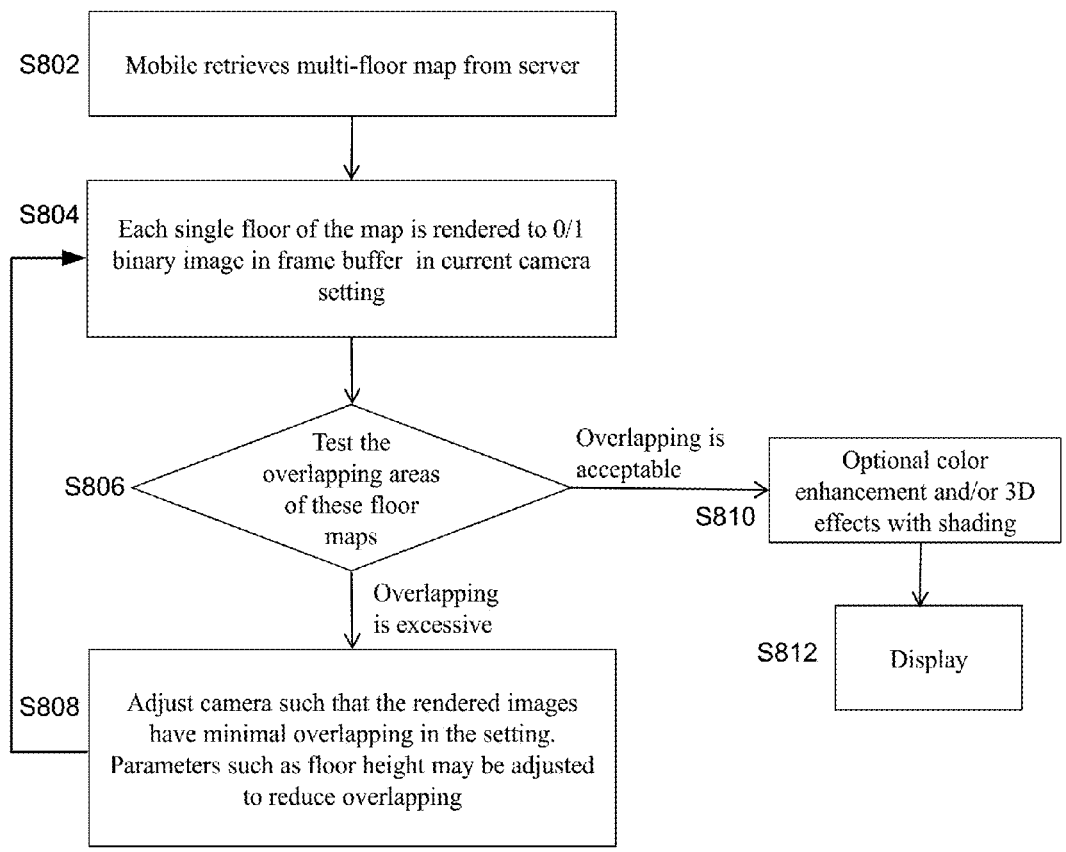
FIG. 8 describes a method for presenting map data in accordance with one embodiment.

FIG. 8 then describes an additional embodiment. FIG. 8 illustrates a non-limiting flow diagram according to one embodiment of the invention. In the embodiment of FIG. 8, OpenGL virtual camera settings may be used in rendering and analyzing map data, as described above. In other alternative embodiments, any other analysis tools may be used that may perform such overlap or display area analysis in conjunction with the embodiments herein. In S802, the mobile device retrieves map information for each floor in a multi-floor building from a server. In S804, each single floor of the map is rendered to 0/1 binary image in a frame buffer using the current virtual camera settings. In S806, the image as rendered in the frame buffer is tested for overlapping areas of the floor maps. If acceptable levels of overlapping are detected between the plurality of floors, then the method proceeds to S812 where the rendered image may be displayed on the display unit. Optionally, in S810, after the acceptable levels of overlap are detected, the image may be further enhanced with color for 3D effects with shading, as discussed with reference to FIG. 3. If in S806, the overlapping is beyond an acceptable threshold, then the method may proceed to S808 where viewing parameters associated with the virtual camera may be adjusted to reduce overlap between the floors and re-render the image in the image buffer and display the image on the mobile device. In one embodiment, parameters such as floor height, may be adjusted to reduce overlapping.

Figure 9:
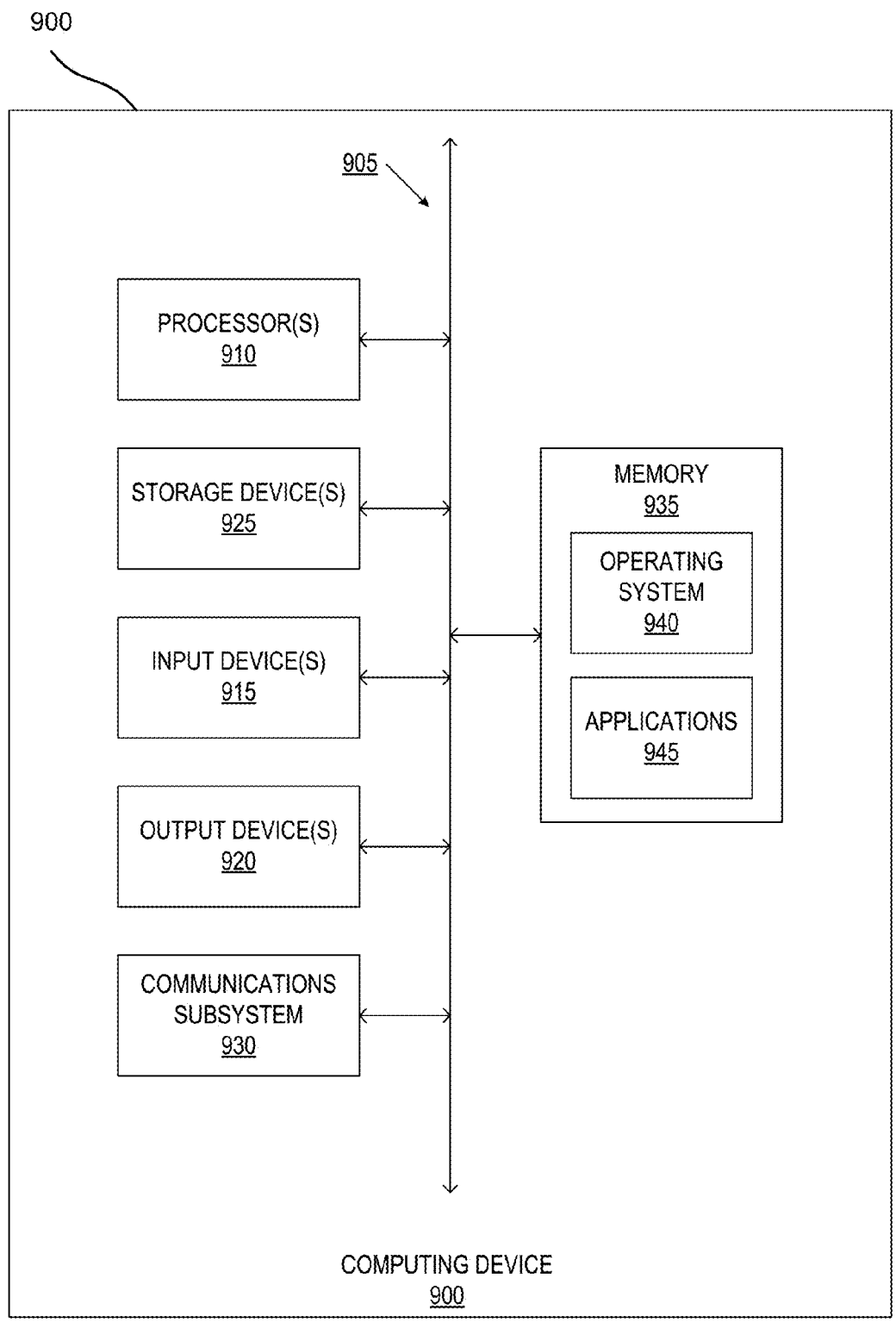
FIG. 9 is one implementation of a computer device according to certain embodiments.

FIG. 9 illustrates an example of a computing system in which one or more embodiments may be implemented. For example, in certain embodiments, the system of FIG. 9 may function as an alternative to mobile device 400. In further embodiments, a network that delivers object, map, or placement data may be implemented using computing systems such as those described by FIG. 9. Additionally, any computing device as described herein may include any combination of components. For example, any alternatives to mobile device 400 may be structured according to the embodiment of computing device 900 of FIG. 9 or any element of computing device 900 in combination with other elements. Thus, in various embodiments, elements or components of a system may be structured as any functional mix of computing elements described herein, such that any function or functions of any device described herein may be implemented by multiple computing devices similar to computing device 900, or any combination of elements of computing device 900.

Figure 10:
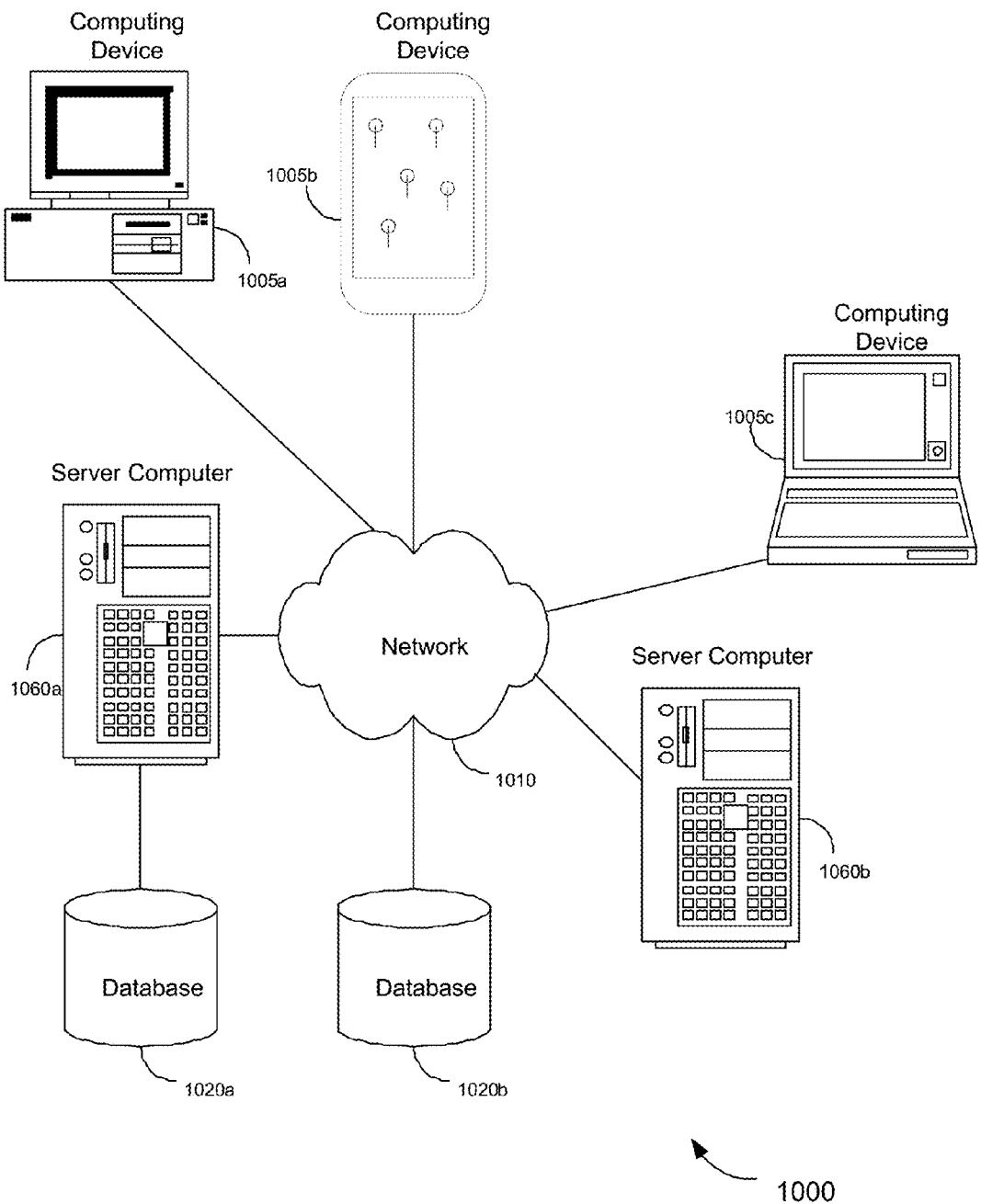
FIG. 10 is one implementation of a networked computer system according to certain embodiments.

FIG. 9 provides a schematic illustration of one embodiment of a computing device 900 that can perform the methods provided by various other embodiments such as the embodiments described herein by FIGS. 4 and 10. FIG. 9 is meant only to provide a generalized illustration of various components, any or all of which may be utilized as appropriate. FIG. 9, therefore, broadly illustrates how individual system elements may be implemented in a relatively separated or relatively more integrated manner, and describes elements that may implement specific methods according to embodiments of the invention when, for example, controlled by computer-readable instructions from a non-transitory computer-readable storage device such as storage device(s) 925.

The computing device 900 is shown comprising hardware elements that can be electrically coupled via a bus 905 (or may otherwise be in communication, as appropriate). The hardware elements may include one or more processors 910, including, without limitation, one or more general-purpose processors and/or one or more special-purpose processors (such as digital signal processing chips, graphics acceleration processors, and/or the like); one or more input devices 915, which can include, without limitation, a mouse, a keyboard and/or the like; and one or more output devices 920, which can include, without limitation, a display device, a printer and/or the like. These elements may be used to display, transform, scale, and orient indications of points that are used to merge maps into a 3D display as described herein using processors 910 to perform the calculations that are part of such transformations of map data.

The computing device 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like. The particular instructions which may define a specific embodiment of map transformation and merging may thus be stored in such non-transitory storage devices and used by one or more processors 910 to cause a computing device 900 to perform an analysis of overlap for 3D maps.

The computing device 900 might also include a communications subsystem 930, which can include, without limitation, a modem, a network card (wireless or wired), an infrared communication device, a wireless communication device and/or chipset (such as a Bluetooth®[1] device, a 702.11 device, a Wi-Fi device, a WiMax device, cellular communication facilities, etc.), and/or similar communication interfaces. The communications subsystem 930 may permit data to be exchanged with a network (such as the network described below, to name one example), other computer systems, and/or any other devices described herein. A mobile device such as mobile device 400 may thus include other communication subsystems in addition to those including wireless transceiver 412 and LAN wireless transceiver 442.

In many embodiments, the computing device 900 will further comprise a non-transitory working memory 935, which can include a RAM or ROM device, as described above. The computing device 900 also can comprise software elements, shown as being currently located within the working memory 935, including an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods for merging maps.

A set of these instructions and/or code might be stored on a computer-readable storage medium, such as the storage device(s) 925 described above. In some cases, the storage medium might be incorporated within a computer system, such as computing device 900. In other embodiments, the storage medium might be separate from a computer system (e.g., a removable medium, such as a compact disc), and/or provided in an installation package, such that the storage medium can be used to program, configure and/or adapt a general-purpose computer with the instructions/code stored thereon. These instructions might take the form of executable code, which is executable by the computing device 900, and/or might take the form of source and/or installable code, which, upon compilation and/or installation on the computing device 900 (e.g., using any of a variety of generally available compilers, installation programs, compression/decompression utilities, etc.) then takes the form of executable code. 3D display management module 421 may thus be executable code as described herein.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, controls for sensors such as cameras, accelerometers, magnetometers, gyroscopes, or other such modules may be implemented as hardware, software, or firmware within a computing device 900. An activity selection subsystem may be configured to provide some or all of the features described herein relating to the selection of acceptable characteristics for an output 3D image created from multiple two-dimensional sources. Such subsystems comprise hardware and/or software that is specialized (e.g., an application-specific integrated circuit (ASIC), a software method, etc.), or generic (e.g., processor(s) 910, applications 945 which may, for example, implement any module within memory 420, etc.) Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the computing device 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including (but not limited to) non-volatile media, non-transitory media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 420 or as secure memory if structured to maintain security of stored content.

The communications subsystem 930 (and/or components thereof) generally will receive the signals, and the bus 905 might then carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

In various embodiments described herein, computing devices may be networked in order to communicate information. For example, mobile device 400 may be networked to receive information as described above. Additionally, each of these elements may engage in networked communications with other devices such as web servers, databases, or computers which provide access to information to enable applications via network.

FIG. 10 illustrates a schematic diagram of a system 1000 of networked computing devices that can be used in accordance with various embodiments to enable systems such as system 1000 or other systems that may implement map merging. The system 1000 can include one or more user computing devices 1005. The user computing devices 1005 can be general-purpose personal computers (including, merely by way of example, personal computers and/or laptop computers running any appropriate flavor of Microsoft® Windows®[2] and/or Mac OS®[3] operating systems) and/or workstation computers running any of a variety of commercially-available UNIX®[4] or UNIX-like operating systems. These user computing devices 1005 can also have any of a variety of applications, including one or more applications configured to perform methods of the invention, as well as one or more office applications, database client and/or server applications, and web browser applications. Alternatively, the user computing devices 1005 can be any other electronic device, such as a thin-client computer, Internet-enabled mobile telephone, and/or personal digital assistant (PDA), capable of communicating via a network (e.g., the network 1010 described below) and/or displaying and navigating web pages or other types of electronic documents. Although the exemplary system 1000 is shown with three user computing devices 1005a-c, any number of user computing devices can be supported.

Certain embodiments of the invention operate in a networked environment, which can include a network 1010. The network 1010 can be any type of network familiar to those skilled in the art that can support data communications using any of a variety of commercially-available protocols, including, without limitation, TCP/IP, SNA, IPX, Apple-Talk®[3], and the like. Merely by way of example, the network 1010 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks. Network 1010 may include access points for enabling access to network 1010 by various computing devices.

Embodiments of the invention can include one or more server computers 1060. Each of the server computers 1060 may be configured with an operating system, including, without limitation, any of those discussed above, as well as any commercially (or freely) available server operating systems. Each of the server computers 1060 may also be running one or more applications, which can be configured to provide services to one or more user computing devices 1005 and/or other server computers 1060. For example, in one embodiment, server computer 1060a may run a first map application that provides a first map to mobile device 400 and server computer 1060b may run a second application that provides a second map to mobile device 400.

Merely by way of example, one of the server computers 1060 may be a web server, which can be used, merely by way of example, to process requests for web pages or other electronic documents from user computing devices 1005. The web server can also run a variety of server applications, including HTTP servers, FTP servers, CGI servers, database servers, Java®[5] servers, and the like. In some embodiments of the invention, the web server may be configured to serve web pages that can be operated within a web browser on one or more of the user computing devices 1005 to perform methods of the invention. Such servers may be associated with particular IP addresses, or may be associated with modules having a particular URL, and may thus store secure navigation modules which may interact with a mobile device such as mobile device 400 to provide secure indications of geographic points as part of location services provided to mobile device 400.

In accordance with further embodiments, one or more server computers 1060 can function as a file server and/or can include one or more of the files (e.g., application code, data files, etc.) necessary to implement methods of various embodiments incorporated by an application running on a user computing device 1005 and/or another server computer 1060. Alternatively, as those skilled in the art will appreciate, a file server can include all necessary files, allowing such an application to be invoked remotely by a user computing device 1005 and/or server computer 1060. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1060a (and/or a user computing device 1005). Alternatively, a database 1020b can be remote from any or all of the user computing devices 1005 or server computers 1060, so long as the database 1020b can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the user computing devices 1005 or server computers 1060 can be stored locally on the respective computer and/or remotely, as appropriate.) In one set of embodiments, the database 1020 can be a relational database, such as an Oracle®[5] database, that is adapted to store, update, and retrieve data in response to SQL-formatted commands. The database might be controlled and/or maintained by a database server, as described above, for example. Such databases may store information relevant to levels of security, such as which users may access certain levels of security, which map details may be included in certain maps of a security level, or any other such details which may be used as part of location assistance or location access data. Location data which may be sensitive, such as indications of points associated with a particular mobile device, may have associated security, while crowd sourced data, which includes indications of pluralities of points which cannot be associated with a particular device, may have lower security levels.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application's various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method for optimized map presentation comprising:
   receiving, at a mobile device, a first set of placement data associated with a first building level of a location;
   receiving, at the mobile device, a second set of placement data associated with a second building level of the location;
   determining, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters based on corresponding points between the first building level and the second building level, for a three-dimensional representation of an interior of the location, and (b) the first set of placement data and the second set of placement data, wherein determining overlap comprises rendering the image of the first building level of the location and the second building level of the location and determining that a ratio of (i) a number of overlapping pixels between the first building level of the location and the second building level of the location to (ii) a total number of pixels is beyond a threshold; and adjusting, at the mobile device, the set of viewing parameters to reduce overlap between the three-dimensional representation of the first building level of the location and the three-dimensional representation of the second building level of the location in the three-dimensional rendering of the image of the location.

2. The method of claim 1, wherein the first set of placement data and second set of placement data comprise map data.

3. The method of claim 1, wherein adjusting the set of viewing parameters comprises at least one of:
   changing a distance between a viewing position and the building levels of the location;
   changing a tilt associated with the viewing position;
   changing a distance between the first and second building levels of the location; or
   changing a placement of the viewing position; or
   any combination thereof.

4. The method of claim 1, wherein determining the overlap between the first building level of the location and the second building level of the location is performed in response to a change in a placement of a viewing position.

5. The method of claim 4, wherein the placement of the viewing position is changed by at least one of:
   an input received from a user;
   a context of the user; or
   a search query received from the user; or
   any combination of the above.

6. The method of claim 1, further comprising:
   determining a back-facing boundary associated with the first building level of the location and the second building level of the location; and
   shading a region between the back-facing boundary of the first building level of the location and the second building level of the location.

7. A device with optimized functionality for map presentation, the device comprising:
   a memory; and
   a processor coupled to the memory, wherein the memory comprises a 3D display management module that, when executed by the processor, causes the processor to:
   receive a first set of placement data associated with a first building level of a location;
   receive a second set of placement data associated with a second building level of the location;
   determine, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters based on corresponding points between the first building level and the second building level, for a three-dimensional representation of an interior of the location, and (b) the first set of placement data and the second set of placement data, wherein determination of overlap comprises render the image of the first building level of the location and the second building level of the location and determine that a ratio of (i) a number of overlapping pixels between the first building level of the location and the second building level of the location to (ii) a total number of pixels is beyond a threshold; and
   adjust, at the mobile device, the set of viewing parameters to reduce overlap between the three-dimensional representation of the first building level of the location and the three-dimensional representation of the second building level of the location in the three-dimensional rendering of the image of the location.

8. The device of claim 7 further comprising:
   a display output;
   wherein the processor further outputs an adjusted rendering of the image to the display output for display.

9. The device of claim 7 wherein adjusting the set of viewing parameters comprises changing a distance between a viewing position and the building levels of the location, changing a tilt associated with the viewing position, changing a distance between the first and second building levels of the location, and changing a placement of the viewing position.

10. The device of claim 7 wherein the placement data comprises map data.

11. A mobile device with optimized functionality for map presentation, the device comprising:
    means for receiving, at the mobile device, a first set of placement data associated with a first building level of a location;
    means for receiving, at the mobile device, a second set of placement data associated with a second building level of the location;
    means for determining, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters based on corresponding points between the first building level and the second building level, for a three-dimensional representation of an interior of the location, and (b) the first set of placement data and the second set of placement data, wherein means for determining overlap comprises means for rendering the image of the first building level of the location and the second building level of the location and means for determining that a ratio of (i) a number of overlapping pixels between the first building level of the location and the second building level of the location to (ii) a total number of pixels is beyond a threshold; and
    means for adjusting, at the mobile device, the set of viewing parameters to reduce overlap between the three-dimensional representation of the first building level of the location and the three-dimensional representation of the second building level of the location in the three-dimensional rendering of the image of the location.

12. The device of claim 11, wherein the placement data comprises map data.

13. The device of claim 11 wherein means for adjusting the set of viewing parameters comprises means for changing a distance between a viewing position and the building levels of the location, changing a tilt associated with the viewing position, changing a distance between the first and second building levels of the location, and changing a placement of the viewing position.

14. The device of claim 11, further comprising:
means for determining a back-facing boundary associated with the first building level of the location and the second building level of the location; and
means for shading a region between the back-facing boundary of the first building level of the location and the second building level of the location.

15. A non-transitory computer-readable medium comprising computer-readable instructions for map presentation that, when executed by a processor, cause a mobile device to perform a method for optimized display of maps, the method comprising:
receiving, at a mobile device, a first set of placement data associated with a first building level of a location;
receiving, at the mobile device, a second set of placement data associated with a second building level of the location;
determining, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters based on corresponding points between the first building level and the second building level, for a three-dimensional representation of an interior of the location, and (b) the first set of placement data and the second set of placement data, wherein determining overlap comprises rendering an image of the first building level of the location and the second building level of the location and determining that a ratio of (i) a number of overlapping pixels between the first building level of the location and the second building level of the location to (ii) a total number of pixels is beyond a threshold; and
adjusting, at the mobile device, the set of viewing parameters to reduce overlap between the three-dimensional representation of the first building level of the location and the three-dimensional representation of the second building level of the location in the three-dimensional rendering of the image of the location.

16. The non-transitory computer-readable medium of claim 15 wherein adjusting the set of viewing parameters comprises changing a distance between a viewing position and the building levels of the location, changing a tilt associated with the viewing position, changing a distance between the first and second building level of the location, and changing a placement of the viewing position.

17. The non-transitory computer-readable medium of claim 15 wherein determining the overlap between the first building level of the location and the second building level of the location is performed in response to a change in a placement of a viewing position; and
wherein the placement of the viewing position is changed by one or more of:
an input received by a user,
a context of the user; or
a search query received from the user; or
any combination of the above.

18. A method for optimized map presentation comprising:
receiving, at a mobile device, a first set of placement data associated with a first building level of a location;
receiving, at the mobile device, a second set of placement data associated with a second building level of the location;
determining, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters, for a three-dimensional representation of an interior of the location, and (b) the first set of placement data and the second set of placement data, wherein determining overlap between the first building level of the location and the second building level of the location comprises rendering the image of the first building level of the location and the second building level of the location and determining that a ratio of (i) a number of overlapping pixels between the first building level of the location and the second building level of the location to (ii) a total number of pixels is beyond a threshold; and
adjusting, at the mobile device, the set of viewing parameters to reduce overlap between the three-dimensional representation of the first building level of the location and the three-dimensional representation of the second building level of the location in the three-dimensional rendering of the image of the location.

19. A device with optimized functionality for map presentation, the device comprising:
a memory; and
a processor coupled to the memory, wherein the memory comprises a 3D display management module that, when executed by the processor, causes the processor to:
receive a first set of placement data associated with a first building level of a location;
receive a second set of placement data associated with a second building level of the location;
determine, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location, using (a) a set of viewing parameters for a three-dimensional representation of an interior of the location, and (b) the first set of placement data and the second set of placement data, wherein the determination of overlap between the first building level of the location and the second building level of the location comprises render the image of the first building level of the location and the second building level of the location and determine that a ratio of (i) a number of overlapping pixels between the first building level of the location and the second building level of the location to (ii) a total number of pixels is beyond a threshold; and
adjust, at the mobile device, the set of viewing parameters to reduce overlap between the three-dimensional representation of the first building level of the location and the three-dimensional representation of the second building level of the location in the three-dimensional rendering of the image of the location.

20. A mobile device with optimized functionality for map presentation, the device comprising:

means for receiving, at the mobile device, a first set of placement data associated with a first building level of a location;

means for receiving, at the mobile device, a second set of placement data associated with a second building level of the location;

means for determining, at the mobile device, overlap between a three-dimensional representation of the first building level of the location and a three-dimensional representation of the second building level of the location in a three-dimensional rendering of an image comprising the three-dimensional representation of the first building level of the location and the three-dimensional representation of the second building level of the location using (a) a set of viewing parameters for a three-dimensional representation of an interior of the location, and (b) first set of placement data and the second set of placement data, wherein means for determining overlap between the first building level of the location and the second building level of the location further comprises means for rendering the image of the first building level of the location and the second building level of the location and means for determining that a ratio of (i) a number of overlapping pixels between the first building level of the location and the second building level of the location to (ii) a total number of pixels is beyond a threshold; and means for adjusting, at the mobile device, the set of viewing parameters to reduce overlap between the three-dimensional representation of the first building level of the location and the three-dimensional representation of the second building level of the location in the three-dimensional rendering of the image of the location.

* * * * *